United States Patent [19]

Lundin

[11] Patent Number: 4,831,955
[45] Date of Patent: May 23, 1989

[54] ARRANGEMENT IN A WATER CRAFT FOR COLLECTING OIL OR OTHER CONTAMINANTS PRESENT ON THE SURFACE OF WATER

[75] Inventor: Lars Lundin, Porvoo, Finland

[73] Assignee: Oy Lars Lundin Patent Ab, Porvoo, Finland

[21] Appl. No.: 163,594

[22] Filed: Mar. 3, 1988

[30] Foreign Application Priority Data

Mar. 4, 1987 [FI] Finland ................................ 870951

[51] Int. Cl.⁴ ............................................ B63B 35/00
[52] U.S. Cl. .................................. 114/270; 210/242.3
[58] Field of Search ............... 114/270, 40; 210/242.3, 210/923

[56] References Cited

U.S. PATENT DOCUMENTS

| | | | |
|---|---|---|---|
| 3,730,346 | 5/1973 | Prewitt | 210/242.3 |
| 3,754,653 | 8/1973 | Verdin | 210/242.3 |
| 3,756,414 | 9/1973 | Crisafulli | 210/242.3 |
| 3,762,558 | 10/1973 | Anderson | 210/242.3 |

FOREIGN PATENT DOCUMENTS

| | | |
|---|---|---|
| 3119627 | 5/1981 | Fed. Rep. of Germany . |
| 1557657 | 1/1969 | France ................. 114/270 |
| 423640 | 2/1980 | Sweden . |
| 2145005 | 1/1983 | United Kingdom . |

Primary Examiner—Joseph F. Peters, Jr.
Assistant Examiner—Jesûs D. Sotelo
Attorney, Agent, or Firm—Biebel, French & Nauman

[57] ABSTRACT

An arrangement in a water craft is described for collecting oil present on the surface of water, especially among blocks of ice. The arrangement comprises a bow part (2) the flat lower surface (3) of which is gently sloping and equipped with inlet openings for contaminated water. When the craft is moving forwards, blocks of ice are pressed under the surface (3) and at the same time rinsed. The rinsing can be promoted by means of strong water jets. In order to achieve the optimal operating conditions in each particular case, the bow part (2) has been arranged to be a part separate from the hull (1) of the craft and capable of being raised and lowered in relation to the hull, which also enables this bow part to be coupled to an already existing craft of suitable size. The bow part comprises separating devices (9) for separating oil from the inflowing water, as well as a device for removing the cleaned water. The recovered oil is conveyed continuously from the bow part (2) to a tank located, for example, in the craft.

7 Claims, 2 Drawing Sheets

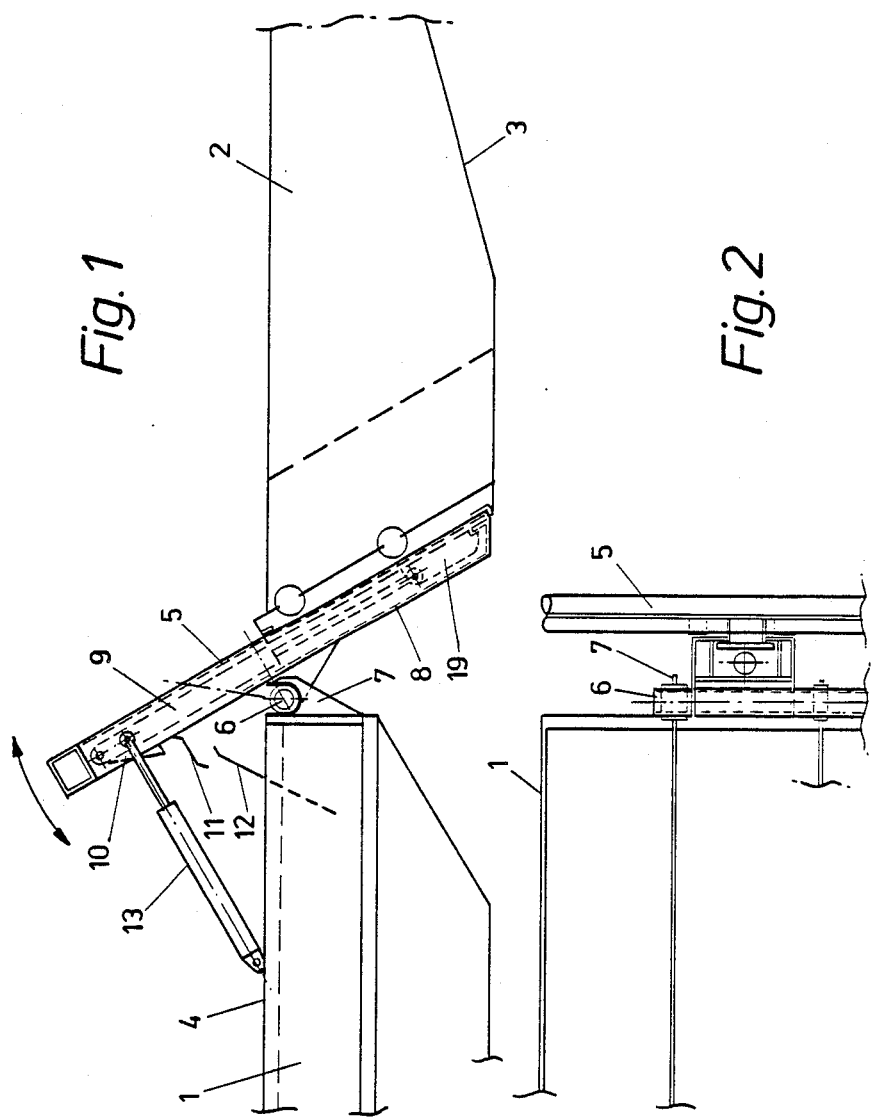

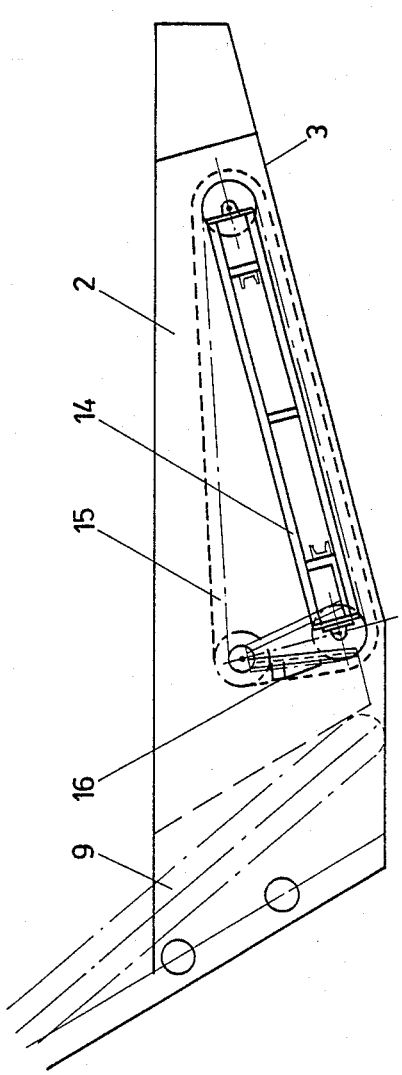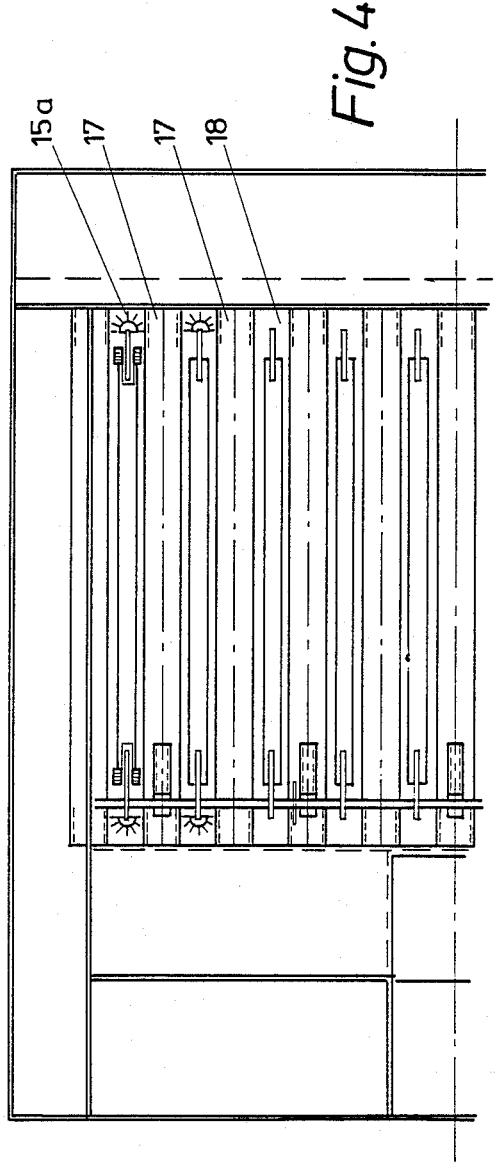

ARRANGEMENT IN A WATER CRAFT FOR COLLECTING OIL OR OTHER CONTAMINANTS PRESENT ON THE SURFACE OF WATER

The present invention relates to an arrangement in a water craft for collecting oil or other contaminants present on the surface of water, the arrangement comprising a bow part the lower surface of which is substantially flat and gently sloping, as well as provided with inlets for the water which contains contaminants, and the craft is additionally equipped with separating devices for separating the contaminants from the inflowing water, and with an outlet for cleaned water.

One such arrangement is described in, for example, Patent Application FI-840 875 (U.S. application Ser. No. 049,016 filed Apr. 30, 1987, which is a continuation of Ser. No. 799,378 filed Oct. 25, 1985), assigned to the same assignee as this invention. This known device, as well as other previously known devices of this type, are especially intended for the recovery of oil present among blocks of ice, the purpose of the gently sloping bow part being that, when the craft is moving forwards, blocks of ice are pressed below the water surface by the bow so that at the same time oil is rinsed at least partly off the ice. In order to promote the rinsing off of the oil, in the device according to the above-mentioned application Ser. No. 049,016 there are fitted on the sides of the bow water nozzles which continuously direct strong jets of water onto the blocks of ice.

One problem in these known types of water craft is that, depending on the thickness of the ice and the size of the blocks, the blocks of ice left under the bow may in part clog this area entirely so that new ice blocks appearing at the bow of the craft are merely pushed to the sides, or that the craft stops completely. For this reason the craft must under difficult conditions continuously reverse and move forwards in alternation. Another problem is, of course, that the constructing of such a craft is disadvantageous in terms of the total economy, for the reason that such craft are hardly usable for other purposes.

The object of the present invention is therefore to provide an improvement which facilitates the maneuvering of the craft and the collecting of oil or other contaminants from the surface of water, and which enables a water craft to be equipped for the said purpose at a lower cost than previously.

In order to achieve these objectives, the arrangement according to the invention is characterized in that the said bow part is a part separate from the actual hull of the craft, fitted movably in relation to the hull, especially in such a manner that it can be raised and lowered.

It is previously known to attach to the bow of a water craft oil-collecting devices the height level of which is adjustable. For example, in Patent Application DE-3 119 627, the adjustable device comprises a funnel-like trough having a curved collecting wall. In Patent Application GB-2 145 005, which also relates to a so-called skimmer, the collector is a V-shaped member, which may also be of a floating type. In Patent U.S. Pat. No. 3,762,558 the device is a conveyor the submersion depth of which is adjustable.

In these known arrangements the question is thus of auxiliary devices which are installed in a normal water craft. In deviation to these, the present invention instead comprises fitting the conventionally fixed bow part of the craft so as to be movable. In addition, the purpose of the movably fitted bow is to adjust the moving of the craft according to the ice conditions and not to adjust the thickness of the layer skimmed.

Furthermore, the arrangement according to the invention enables the lower surface of the bow which directs blocks of ice to be set in a suitable position in relation to the surface of water, i.e. the blocks of ice, so that it works in the optimal manner in any given case. If, for example, the area under the lower surface tends to become clogged, the bow part can temporarily be raised without the craft needing to stop.

One especially significant advantage of the invention also lies in that it is not necessary to construct a whole water craft for this specific purpose, but an old already existing craft, for example, can be fitted permanently or temporarily with the separate bow arrangement according to the invention. Since the low part is preferably raisable completely out of the water, the craft can also be used for other purposes without the bow part affecting its maneuvering properties.

It is, of course, expedient to arrange in the separate bow part also the other essential parts of the collecting equipment, such as the oil-separating devices and the devices for removing the cleaned water. Furthermore, it is suitable to arrange the separating devices so that the contaminants separated from the water, especially the oil, are conveyed from the bow part to the actual craft during the separating; in the actual craft, of course, there may be a larger tank for receiving the collected oil. It is possible to collect in the craft even large amounts of oil or of oil/water without this hampering the operation, since the height of the bow part can be adjusted according to the loading of the craft.

The invention is described below in greater detail in the form of an example and with reference to the accompanying drawings, in which:

FIG. 1 depicts a side view, partly diagrammatic, of an arrangement according to the invention, FIG. 2 depicts a top view of a part of the coupling between the craft and the separate bow, FIG. 3 depicts a side view of an oil-separating device fitted inside the bow part, and FIG. 4 depicts a top view of the arrangement according to FIG. 3.

The arrangement presented in the drawings is intended especially for the collection of oil present on the surface of water among blocks of ice. The actual hull of the craft, of which only the front part is shown in FIG. 1, is indicated by reference numeral 1. To this hull there is according to the invention coupled a substantially separate bow part 2, which has been designed specifically for the above-mentioned oil-collecting function and is movable in relation to the hull 1 according to prevailing conditions.

When oil is being collected, the bow part 2 is kept in such a position that the greater part of the gently sloping lower surface 3 is just below the water surface so that the surface water with the oil present in it can flow in through the oblong openings (18 in FIG. 4) in the surface 3. When the craft is moving forward the oily blocks of ice are pressed below the water surface and the oil is at least in part rinsed off them. This rinsing off can be suitably promoted by means of strong jets of water aimed at the blocks, as is described in the above-mentioned application U.S. Ser. No. 049,016, which is incorporated into the present specification by means of this reference.

At the rear edge of the bow part 2 there is a rigid structure 5, positioned obliquely upwards, which extends above the deck 4 of the hull 1 and is coupled to the hull 1 by means of hydraulic cylinders 13. Furthermore, this part 5 is, approximately at its middle, articulated via a transverse axle 6 to bear on support brackets 7 in the front part of the hull 1 so that the bow part 2 can be raised and lowered by means of the hydraulic cylinder 13. In this case the hull 1 has a straight front part, since the craft is construed to be a thrust-lighter.

In addition to this, the bow part 2 itself may be fitted so as to be movable up and down along the structure 5, for which purpose there are power means 8, not shown in greater detail. These means may be, for example, hydraulic cylinders which function in the manner of the lifting cylinders of a forklift truck. The bow part 2 can, furthermore, be locked in the lower position by means of a latch 19.

From the oil-contaminated water accumulated in the trough-like bow part 2 the oil is lifted by means of oil separating and lifting devices 9, and is scraped off from the separating devices 9 by means of a cleaner 10 and directed along troughs or corresponding means 11, 12 into a tank in the craft. The cleaned water is removed from the bow part through outlet openings arranged behind the device 9, and additionally there may be pump means for removing the water and possibly at the same time for aiming water jets at the blocks of ice, as described above.

As is shown in FIGS. 3 and 4, in the gently sloping lower surface 3 of the bow part 2 there are arranged inlet slots 18, which are separated from each other by means of, for example, sturdy pipes 17. In the bow part 2 there is additionally arranged an oil-conveying device which is substantially made up of a framework 14 and, rotating around the framework, a device 15 which runs on wheels and is for its part made up of several adjacent loops 15 the lower parts of which run in the slots 18 and which each comprise successive parts provided with bristles 15a.

The oil-collecting and conveying device 15 has been fitted to rotate so that the oil is conveyed on the floor of the bow part 2 towards the stern, whereupon the oil adhering to each loop is scraped off by means of the device 16 so that oil can further pass to the separating device 9.

The separating device 9 is in principle similar to the device 15, i.e. it is made up of several adjacent loops each of which comprises a number of successive bristled parts. The devices 9 and 15 can in principle be similar to those described in, for example, EP Patent Application No. 84303776.3, which publication is incorporated into the present specification by means of this reference. In this case it is advantageous to make the bristles of the device 15 of a somewhat thicker and rougher plastic, since their purpose is only to transfer the oil towards the stern and not actually to collect oil. The loops of the device 15 have the further purpose of keeping the slots 18 clean and substantially also of preventing small blocks of ice from penetrating into the bow part 2.

As described above, the accumulated oil is conveyed upwards by means of the device 9, the loops of the device 9 are continuously cleaned by means of the cleaners 10, and the oil is directed into the water craft. As regards the cleaning devices 10 and 16, reference is made to EP Pat. No. 122091, which is also incorporated into the present specification by means of this reference. It would, of course, also be possible to implement the devices 15 and 9 as one single device the lower part of which would run along the slots 18 and the rear part would serve to lift oil in the manner of the device 9.

It is clear that the arrangement described can be varied in many ways without deviating from the idea of the invention, according to which the essential idea is that the bow part is substantially separate from the rest of the hull of the craft and capable of being moved. As described above, in addition to providing an operating position adjustable according to prevailing conditions, this makes it possible to construct for this purpose only a bow part and to fit it to a suitable existing suitable craft, thus achieving a considerable cost saving.

I claim:

1. An arrangement in a water craft for collecting oil or other contaminants present on the surface of water in which said water craft has a hull including a bow part, the arrangement comprising:

said bow part having a lower surface which is substantially flat and gently sloping and provided with inlet openings for contaminated water, the bow part being additionally equipped with separating devices for separating contaminants from the inflowing water, said bow part being separate from the hull of the craft, and power means provided between said hull and said bow part so as to enable moving, particularly raising and lowering of the bow part in relation to the hull.

2. An arrangement according to claim 1 wherein said power means comprises hydraulic cylinders between the bow part and the craft hull.

3. An arrangement according to claim 1, wherein the rear of the bow part is hinged to the hull of the craft.

4. An arrangement according to claim 3, wherein the bow part has a rear wall, a rigid structure adjoining the rear wall of the bow part, the structure extending upward above the deck of the water craft, and at least one hydraulic cylinder being provided between an upper part of the said structure and the hull of the craft.

5. An arrangement according to claim 4, wherein that part of the bow part in which said lower surface is provided, is fitted so as to be movable up and down along the said rigid structure.

6. An arrangement according to claim 5, wherein the separating devices are made up of bristled parts formed into endless loops, the separating devices at the same time lifting oil continuously from the surface of water inside the bow part and the separating devices being fitted to extend upwards above the deck of the craft, and the arrangement further comprising cleaners for the separating devices, and means for directing the separated oil from said cleaners to a tank in the water craft.

7. An arrangement according to claim 1, wherein the hull is a thrust-lighter.

* * * * *